United States Patent
Knappe

[11] 3,806,222
[45] Apr. 23, 1974

[54] SCANNING LIGHT BARRIER

[75] Inventor: Hartmut Knappe, Waldkirch, Germany

[73] Assignee: Firma Erwin Sick, Waldkirch, Germany

[22] Filed: Apr. 10, 1972

[21] Appl. No.: 242,595

[30] Foreign Application Priority Data
Apr. 10, 1971 Germany.................... 2117500

[52] U.S. Cl..................... 350/7, 178/7.6, 350/103
[51] Int. Cl. ........................................... G02b 17/00
[58] Field of Search............ 178/7.6; 350/6, 7, 285, 350/15, 275, 103

[56] References Cited
UNITED STATES PATENTS

| 3,449,945 | 6/1969 | Mohrman ..................... 350/74 X |
| 3,456,997 | 7/1969 | Stites et al. .................... 350/7 |
| 3,226,557 | 12/1965 | Goodman ..................... 350/275 |
| 2,944,463 | 7/1960 | Rantsch ........................ 350/15 |
| 3,604,932 | 9/1971 | Beach ........................... 350/7 |

Primary Examiner—Ronald L. Wibert
Assistant Examiner—Michael J. Tokar
Attorney, Agent, or Firm—Darbo, Robertson & Vandenburgh

[57] ABSTRACT

A scanning light barrier comprising a light source for generating a light beam, beam-deflecting optical means in the path of rays of this light beam by which the light beam is deflected periodically via a surface being observed, a reflex reflector strip beyond the surface being observed by which the light beam is reversible in itself and a beam splitter by which the return light beam is directed onto a photoelectric detector, the beam splitter being disposed in the path of rays of the return light beam so that the return light beam strikes the beam splitter before reaching the beam-deflecting optical means, the photoelectric detector being arranged at a location where the return light beam reflected by the reflex reflector and by the beam splitter is stationary.

5 Claims, 1 Drawing Figure

PATENTED APR 23 1974    3,806,222
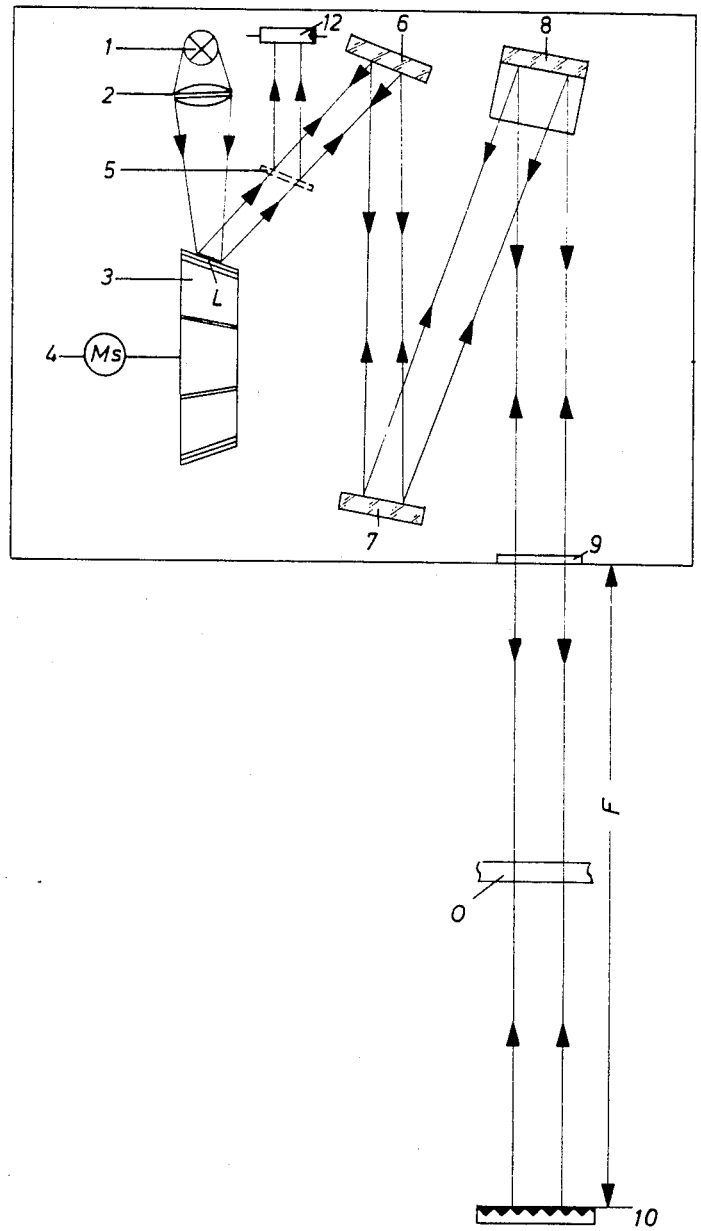

SCANNING LIGHT BARRIER

This invention relates to a scanning light barrier comprising means for generating a light beam, beam-deflecting optical means in the path of rays of this light beam by which the light beam is deflected periodically via a surface being observed, a reflex reflector strip beyond the surface being observed by which the light beam is reversible in itself and a beam splitter by which the return light beam is directed onto a photoelectric detector.

A scanning light barrier (light curtain) of the kind above referred to is, for example, disclosed in British Pat. No. 1,134,074. In this prior specification the beam splitter of the scanning light barrier is arranged between the light source and the beam-deflecting optical means (mirror wheel or oscillatory mirror). With such scanning light barriers problems are encountered if self-luminous object are to be detected, because even if the scanning light beam is interrupted by the object, radiation emitted by the scanned object itself reaches the detector. Thus, no signal or only a poor signal is obtained when detecting such an object. This problem, for instance, occurs with measuring light curtains which are used for midband control after annealing furnaces, since in such cases the radiation from the self-luminous object can vary very strongly depending on the rate of feed and the material strength.

It is an object of this invention to so devise a scanning light barrier of the type indicated that it responds unobjectionably also to self-luminous objects.

According to the invention this object is solved by providing that the beam splitter is disposed in the path of rays of the return light beam in front of the beam-deflecting optical means and the photoelectric detector is arranged at a location where the return light beam reflected by the reflex reflector and by the beam splitter is stationary. The beam-deflecting optical means can for example be a motor mirror or oscillatory mirror.

With the arrangement according to the invention, the beam splitter and the detector, as seen from the object, are disposed in front of the beam-deflecting optical means; the radiation from the object impinging upon the detector is therefore not modulated by the beam-deflecting optical means. By the radiation emitted by the object the detector thus obtains a steady light component constant in time and independent of the beam-deflecting optical means. On this steady light component is superimposed the light which is emitted by the light source of the scanning light barrier via the beam-deflecting optical means to the reflex reflector strip and is reflected by the latter via the beam splitter onto the photoelectric detector. This light proportion is interrupted periodically by the object whether the latter is glowing or not and modulated at the scanning frequency. Thus if an object is in the field of view of the scanning light barrier, a dark pulse will appear on the detector, whose level is independent of whether the object is self-luminous or not. An essential aspect of the invention is that also in the return path of rays a location can be found in front of the beam-deflecting optical means where the return light beam reflected by the beam splitter is stationary and thus can be detected by the detector.

With respect to the beam splitter comprising a partially transmitting mirror the photoelectric detector is preferably arranged in mirror image condition to the spot of light which is generated by the beam-generating means on the beam-deflecting means.

As this point is stationary independently of a movement of the beam-deflecting means, for example, a mirror rotor, because the beam-generating means is stationary, the returning rays are directed onto this stationary spot of light. Consequently, however, the mirror image of this stationary spot of light generated by the partially transmitting mirror is also stationary and the returning rays reflected by the partially transmitting mirror from this stationary mirror image at the position where the photoelectric detector is then disposed.

An embodiment of the invention will now be described by way of example with reference to the accompanying FIGURE, the FIGURE showing schematically the path of rays of a scanning light barrier.

From a light source 1 a light beam is generated by means of a collecting optical system 2, the light beam impinging upon a mirror rotor 3. The mirror rotor 3 is driven by a motor 4. By the mirror rotor 3 the light beam is deflected periodically. The light beam impinges upon a plane mirror 6 and is directed by the latter onto another plane mirror 7. From the plane mirror 7 the light beam impinges upon a spherical mirror 8 and passes through a light exit window 9. Then, during rotation of the mirror rotor 3 the beam passes vertically to the paper plane along a path F being monitored, in which a self-luminous object O can be arranged.

Beyond the path F a reflex reflector 10 is arranged which reflects the light beam back in itself. The returning light beam, as indicated, impinges upon a beam splitter 5 in the form of a partially transmitting mirror via the spherical mirror 8 and the plane mirrors 7 and 6. The partially transmitting mirror 5 is inclined with respect to the beam axis and reflects the returning light beam onto a photoelectric detector 12. With respect to the partially transmitting mirror 5 the photoelectric detector 12 is arranged in a mirror image condition to the spot of light L which is generated by the light source 1 and the collecting optical system 2 on the mirror rotor 3. Since this spot of light is stationary independently of the rotation of the mirror rotor, also all of the returning light rays deflected by the reflex reflector 10 pass towards this stationary spot of light L and are thrown by the partially-transmitting mirror 5 partially, i.e., in response to the splitting ratios, onto the detector 12 which is arranged in a mirror image condition to the spot of light L.

The detector 12 receives a steady light proportion from the measuring object O. In addition, it receives modulated light from the light source 1, which has been passed over the reflex reflector 10 and yields a dark pulse when the measuring object O is detected. In contrast to prior art scanning light barriers the scanning light barrier according to the invention thus provides an unobjectionalbe dark pulse also in the case of self-luminous objects, as is also generated in the case of non self-luminous objects.

As it is desirable to use a photoelectric detector of as small a size as practicable it is advantageous to provide means disposed between the beam splitter and the photoelectric detector to reduce the cross-section of the light beam directed onto the said detector. For this purpose, according to one arrangement a tubular member of conical form is disposed between the beam splitter and the photo-electric detector the said member being arranged so that the light beam from the beam splitter enters an end of the member of largest cross-section so that a beam of reduced cross-section is directed onto the photoelectric detector.

What I claim is:

1. In a scanning light barrier for checking on the existence of an object in a given location, which barrier includes means for generating a light beam, beam-deflecting optical means positioned to receive said beam and to periodically deflect the beam to sweep across said location, a reflex reflector strip in the path of the deflected beam beyond said location for reversing the light beam in itself, a photoelectric detector, and a beam splitter by which the return light beam is directed onto the photoelectric detector, the imrovement comprising:

said beam splitter being disposed in the path of the return light beam before the return light beam reaches the beam-deflecting optical means so that a portion of the return light beam will be at rest at a particular location spaced from the beam splitter; and said photoelectric detector being positioned at said location.

2. In a scanning light barrier as claimed in claim 1, wherein the beam splitter is a splitting mirror, the beam generating means produces a spot of light on said part, and the photoelectric detector is positioned in mirror image condition to the spot of light on said part.

3. In a scanning light barrier as claimed in claim 2, wherein said part of the beam-deflecting means comprises a power driven rotor having a plurality of mirrors thereon.

4. In a scanning light barrier as claimed in claim 1, wherein said part of the beam-deflecting means comprises a power driven rotor having a plurality of mirrors thereon.

5. In a scanning light barrier as claimed in claim 1, including a funnel-shaped light piping member is positioned between the beam splitter and the photoelectric detector for reducing the size of said portion of the return light beam.

* * * * *